United States Patent [19]
Friederichs et al.

[11] Patent Number: 5,944,394
[45] Date of Patent: Aug. 31, 1999

[54] PROCESS FOR ATTENUATING THE YAWING MOMENT IN A VEHICLE WITH AN ANTI-LOCK BRAKE SYSTEM (ABS)

[75] Inventors: Otto Friederichs, Garbsen; Harald Köster, Hannover; Konrad Rode, Seelze; Hartmut Rosendahl, Hannover, all of Germany

[73] Assignee: WABCO GmbH, Hannover, Germany

[21] Appl. No.: 08/756,593

[22] Filed: Nov. 27, 1996

[30] Foreign Application Priority Data

Dec. 2, 1995 [DE] Germany .............. 195 45 001

[51] Int. Cl.⁶ .................................................. B60T 8/64
[52] U.S. Cl. ..................... 303/148; 303/140; 303/149; 303/188
[58] Field of Search ...................... 303/146, 148, 303/149, 150, 140, 188, 186, 189

[56] References Cited

U.S. PATENT DOCUMENTS

| | | |
|---|---|---|
| 3,988,043 | 10/1976 | Reinecke . |
| 4,349,876 | 9/1982 | Lindemann . |
| 5,407,258 | 4/1995 | Giers et al. ............... 303/149 X |

FOREIGN PATENT DOCUMENTS

| | | |
|---|---|---|
| 24 60 309 A1 | 6/1976 | Germany . |
| 28 55 326 C2 | 7/1980 | Germany . |
| 36 26 753 A1 | 2/1988 | Germany . |
| 39 19 347 C2 | 2/1990 | Germany . |
| 39 25 828 A1 | 2/1991 | Germany . |
| 40 12 168 C2 | 10/1991 | Germany . |
| 41 14 734 A1 | 11/1992 | Germany . |
| 42 25 983 A1 | 2/1994 | Germany . |
| 44 40 049 A1 | 5/1995 | Germany . |
| 44 06 235 A1 | 8/1995 | Germany . |
| WO 92/19478 | 11/1992 | WIPO . |

*Primary Examiner*—Peter M. Poon
*Attorney, Agent, or Firm*—Proskauer Rose LLP

[57] ABSTRACT

A process for reducing yaw during braking in a vehicle having an anti-lock braking system (ABS) and traveling on a roadway having different coefficients of friction on opposite sides of the vehicle, is disclosed. The process comprises detecting the braking pressures in the wheels of the vehicle, calculating a permissible braking pressure difference, and adjusting the braking pressures in the wheel on the high friction side (high wheel) so as to maintain the permissible braking pressure difference. The permissible braking pressure difference is a variable value which depends mainly on the deregulating pressure ($P_{max}$) at which the ABS begins to deregulate in the low wheel.

13 Claims, 1 Drawing Sheet

5,944,394

PROCESS FOR ATTENUATING THE YAWING MOMENT IN A VEHICLE WITH AN ANTI-LOCK BRAKE SYSTEM (ABS)

BACKGROUND OF THE INVENTION

The present invention relates to a process for attenuating the yawing moment in a vehicle having an anti-lock brake system (ABS).

When a vehicle is braked on a roadway with different frictional values on the two sides of the vehicle ($\mu$ split), the vehicle will tend to pull towards the side of the roadway with the higher frictional value. The driver must counter the yawing moment which causes this tendency to pull by steering against it. This may be a problem for an inexperienced driver, especially if the yawing moment is especially strong due to unfavorable conditions. Unfavorable conditions which exaggerate the yawing moment during braking include a short wheel base, a small load, especially great differences in road condition such as, e.g., concrete on one side of the roadway and ice on the other, and especially strong braking action such as occurs with a regulating anti-lock brake system (ABS).

In vehicles equipped with an anti-lock brake system (ABS), it is already known from DE-OS 28 55 326 (U.S. Pat. No. 4,349,876) to attenuate the yawing moment produced when braking takes place on a road with different surfaces on the right and left sides of the vehicle ($\mu$ split) by building up the braking pressure in the wheel running with the higher coefficient of friction (high wheel) with a predetermined time delay, and then to limit the braking pressure to a constant value, thereby increasing the stability of the vehicle and relieving the driver of the need to counter the yawing moment. This takes place thanks to special measures taken within the electronic system of the anti-lock brake system (ABS).

Lately, vehicles equipped with so-called electrically controlled braking systems (EBS) have also become known. In such braking systems, e.g., the braking system described in DE-OS 44 06 235, the braking pressure (actual value) in a brake cylinder is adjusted to a desired braking value generated by a braking force transmitter. Normally, these EBS braking systems are also equipped with an anti-lock brake system (ABS). Since pressure sensors are utilized to detect the braking pressures in EBS braking systems which are also equipped with an anti-lock brake system (ABS), the sensors may also be utilized to reduce the yawing moment by limiting the braking pressure difference ($\Delta P$) between the "low wheel" (wheel on side of road with low coefficient of friction) and the "high wheel" (wheel on side of the road with high coefficient of friction).

Finally, a conventional anti-lock brake system (ABS) equipped with braking pressure sensors is known from DE-OS 24 60 309 (U.S. Pat. No. 3,988,043) wherein the braking pressure in the high wheel is controlled by the pressure of low wheel which is being regulated by the ABS, or else the braking pressure of the high wheel is kept at a constant value and so a mean brake pressure difference ($\Delta P$) between the braking pressure of the high wheel and the braking pressure of the low wheel is maintained.

It is a disadvantage in these known arrangements that the reduction in yawing moment is constant, i.e., the reduction is not adapted to the different road conditions or the particular vehicle concerned. The maximum braking pressure at the high wheel after the time-delayed build-up depends only on the changes in the low wheel braking pressure as determined by the frictional force of the low wheel. As a result, the maximum braking pressure at the high wheel that would be permitted in maintaining control of vehicle behavior is not always utilized sufficiently. It is thus possible, in some instances, that stopping distance may be sacrificed due to insufficient braking of the high wheel in case of changing characteristics of the road surface.

Under certain circumstances, however, it is also possible that the braking pressure difference ($\Delta P$) may be too high for critical vehicles, so that they can be controlled only with difficulty or not at all by the driver.

The invention has as its object to provide a process for reducing the yawing moment in a vehicle equipped with an anti-lock brake system (ABS), relieving the driver on the one hand from excessive counter-steering, and on the other hand shortening the stopping distance by comparison with the known systems.

SUMMARY OF THE INVENTION

In accordance with the present invention, a process for reducing yaw during braking in a vehicle equipped with an anti-lock braking system (ABS) and traveling on a roadway having different coefficients of friction on opposite sides of the vehicle, is disclosed. The process comprises detecting the braking pressures in the wheels of the vehicle, calculating a permissible braking pressure difference for the steering axle, and adjusting the braking pressure of the high wheels so as to maintain the permissible braking pressure difference. The permissible braking pressure difference ($\Delta P$) is a variable value which depends mainly on the maximal deregulating pressure ($P_{max}$) of the ABS-regulated low-wheels (see FIG. 2).

Through the application of the process according to the invention, an attenuation of yawing moment is achieved which automatically adapts to changing road conditions and vehicle types or loads, and thus contributes to the shortening of the overall stopping distance. At the same time, full control of the vehicle is preserved.

BRIEF DESCRIPTION OF THE DRAWINGS

The invention will now be explained in further detail with reference to the drawings, wherein.

DETAILED DESCRIPTION OF THE INVENTION

Figure 1:
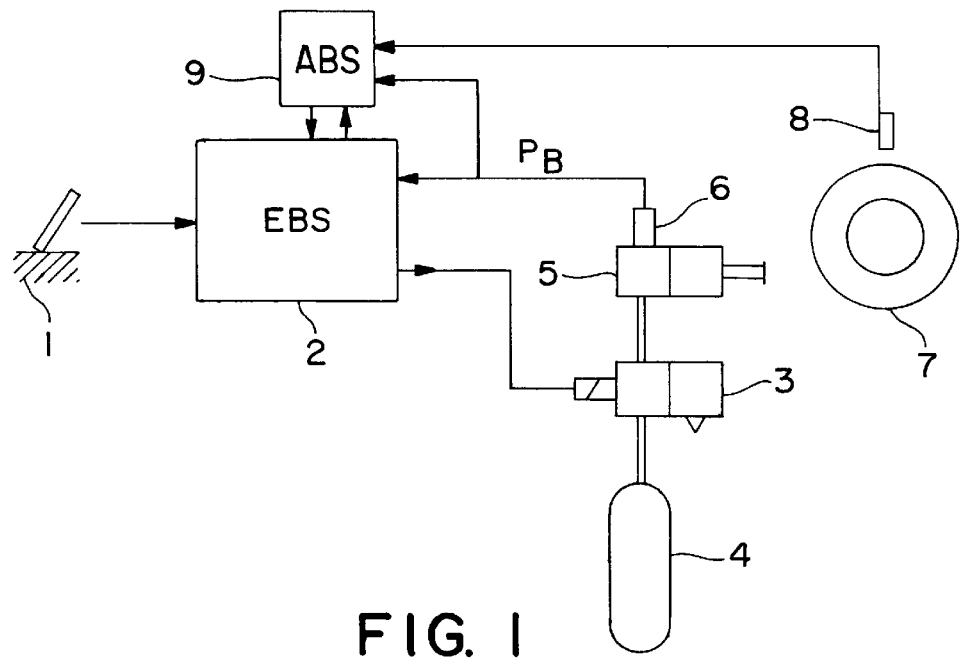
FIG. 1 is a schematic diagram of an electrically controlled brake system (EBS) having an integrated anti-lock brake system (ABS)

FIG. 1 schematically shows a braking system with electrical control (EBS) as a block diagram. A braking force transmitter (1) with electrical signal output is connected to a regulator (2) (EBS electronic system). The driver-desired braking pressure from the braking force transmitter (1) is compared in the regulator (2) with the actual braking pressure of the connected wheel which is measured by a pressure sensor (6) in brake cylinder (5). The actual braking pressure at each wheel is reported back to the regulator (2) as well as to the ABS electronic system (9) as braking pressure ($P_B$). The pressure sensor (6) can also be located in control valve (3).

Deviations between the desired braking pressure and the actual braking pressure are compensated for by means of the control valve (3) actuated by the regulator (2). Control valve (3) is connected to compressed air source (4). It is possible to set the pressure in the brake cylinder (5) to any desired value from zero up to the container pressure in the compressed air source (4) by means of the above-mentioned, constantly functioning, control valve (3).

The vehicle wheel (7) associated with the brake cylinder (5) is equipped with a rotational-speed sensor (8). The latter is connected to ABS electronic system (9). The two electronic systems (2) and (9) exchange data via the illustrated connection lines. Alternatively, the ABS may be integrated as a component or module in the EBS.

If the ABS electronic system (9) detects that locking of the vehicle wheel (7) is imminent, it transmits the appropriate signals to the regulator (2), causing it to lower the excessively high braking pressure. As a result, the wheel is relieved of braking pressure and is given the possibility to rotate once again. As soon as the rotational speed of the wheel (7) has adjusted itself to correspond with the speed of the vehicle, the wheel can again be subjected to braking pressure. This results in pressure regulating cycles with a frequency of approximately 1 Hz on the average.

Figure 2:
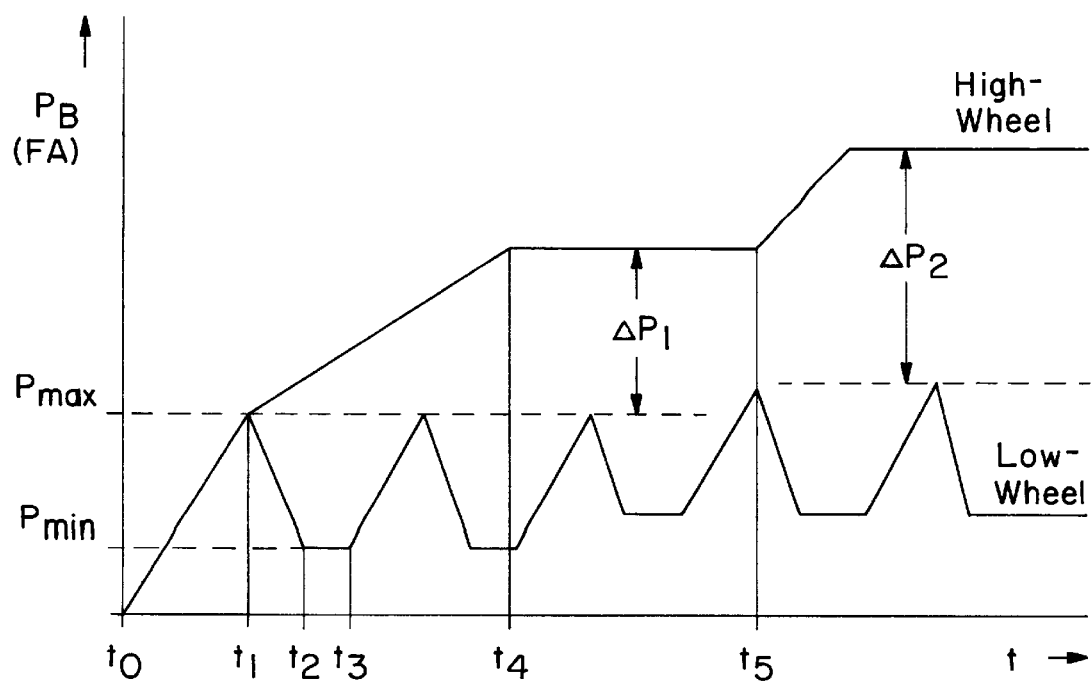
FIG. 2 is a diagram showing the course of braking pressures ($P_B$) of the low wheel and the high wheel of the steeringaxle over a period of time (t).

FIG. 2 shows a diagram in which the braking pressures ($P_B$) of the wheels mounted on the steering or front axle (FA) of a vehicle are recorded over a period of time (t) in accordance with one embodiment of the invention. As can be seen, the braking pressures ($P_B$) for both wheels, i.e., for the high wheel running on the gripping side of the road and for the low wheel running on the smooth side of the road, increase initially at the same rate from the moment ($t_0$), the beginning of braking action.

At the point in time ($t_1$), the ABS electronic system (9) recognizes a tendency of the low wheel to lock up and causes a lowering of the braking pressure in the brake cylinder of the low wheel, lasting until the point in time ($t_2$). The braking pressure at the point in time ($t_1$) is the so-called deregulating pressure ($P_{max}$) at which the ABS electronic system (9) begins to deregulate the braking pressure in the low wheel on the front axle. After time ($t_2$), there follows a pressure-maintaining phase for the low wheel, until a new regulating cycle begins at point in time ($t_3$) with a renewed rise in braking pressure until ($P_{max}$) is once again reached in the low wheel.

At the same time, the braking pressure of the high wheel continues to increase, until the point in time ($t_4$). At time ($t_4$), the EBS regulator (2) begins to operate in accordance with the present invention to keep the braking pressure of the high wheel constant thereby not further increasing the yawing tendency of the vehicle. This occurs as soon as a braking pressure difference ($\Delta P$) has been reached. The rise in braking pressure of the high-wheel can be time-delayed by suitable signals of the ABS (9) in order to slow down the build up of the yawing tendency at the beginning of a braking action ($t_1$ to $t_4$).

The braking pressure difference ($\Delta P$) shown in FIG. 2 as the difference between the braking pressure of the high wheel on the front axle and the ABS deregulating pressure ($P_{max}$) of the low wheel on the front axle. However, the braking pressure difference ($\Delta P$) can also be defined differently, e.g., as the difference between the braking pressure in the high wheel on the front axle and the mean braking pressure of the low wheel on the front axle, e.g., ($P_{max}$+$P_{min}$)/2 (where $P_{min}$=holding pressure), or as the difference between the braking pressure of the high wheel and the current braking pressure of the low wheel.

The braking pressure difference ($\Delta P$) is no longer a fixed constant, as was customary in the past, but, according to the invention, it is a variable value which is dependent on the deregulating pressures ($P_{max}$) of the ABS regulated vehicle wheels (the low wheels). This results in a variable behavior which takes into account road conditions as well as vehicle weight. Tests and theoretical considerations have shown that the yawing tendency, and thereby the braking pressure difference ($\Delta P$) suitable for maintaining vehicle control may be greater as the vehicle weight, and also the friction between tire and roadway, become greater.

As can be seen in FIG. 2, a first braking pressure difference ($\Delta P_1$) is set in the period from ($t_4$) to ($t_5$). From the point in time ($t_5$) on, when the road conditions have improved, as can be recognized from the higher deregulating pressure ($P_{max}$) of the low wheel, a higher braking pressure difference ($\Delta P_2$) is set. The braking pressure ($P_B$) of the high wheel is therefore increased accordingly. This results in the previously mentioned, shortened stopping distance.

In the simplest case, the braking pressure difference ($\Delta P$) is proportional to the deregulating pressure ($P_{max}$) of the low wheel. This has the advantage that under better road conditions, there is a higher utilization of the braking effect of the high wheel, resulting in shorter stopping distance.

It may also be advantageous to calculate the braking pressure difference ($\Delta P$) so as to be proportional to the difference between the highest and the lowest deregulating pressures ($P_{max}$) of the two wheels on the rear axle. This has the advantage that the load on the vehicle, which is used to determine the regulating pressures of the wheels mounted on the rear axle wheel, is especially well taken into account. The above-described calculation results in a greater braking pressure difference ($\Delta P$) as the load increases. This is advantageous, since experience shows that it is easier to handle a loaded vehicle at $\mu$ split frictional conditions than an unloaded one.

It may also be advantageous to set the permissible braking pressure difference ($\Delta P$) to be proportional to the ratio of the highest and the lowest deregulating pressure ($P_{max}$) of the two wheels on the rear (drive) axle.

It may also be advantageous to set the permissible braking pressure difference ($\Delta P$) to be proportional to the sum of the deregulating pressures ($P_{max}$) of the two wheels on the rear axle.

It may furthermore be advantageous to set the permissible braking pressure difference ($\Delta P$) to be proportional to the sum of the deregulating pressures ($P_{max}$) of the two wheels on the rear axle and twice the value of the deregulating pressure ($P_{max}$) of the low wheel on the steering (front) axle.

The relationship between braking pressure difference ($\Delta P$) and deregulating pressure ($P_{max}$) can also be defined so that $\Delta P$ depends on the mean braking pressures of the regulated vehicle wheels, i.e., ($\Delta P$) can be set to depend on ($P_{max}$+$P_{min}$)/2.

All of these variants result in different steering characteristics of the vehicle on a $\mu$ split roadway and if necessary can be selected by the vehicle manufacturer by setting appropriate parameters of the electronic system. The necessary calculations are carried out by the microprocessors contained in the electronic systems (2, 9).

As shown in FIG. 2, the braking pressure ($P_B$) of the high wheel on the steering (front) axle is adjusted as the sum of the deregulating pressure ($P_{max}$) of the low wheel on the steering axle and the calculated braking pressure difference ($\Delta P$). The braking pressure of the high wheel on the steering axle can also be adjusted as the sum of the current braking pressure ($P_B$) of the low wheel on the steering axle and the calculated braking pressure difference ($\Delta P$).

In a vehicle with a liftable axle, the wheel load on the neighboring (drive) axle is reduced when the liftable axle is lowered. This reduction of the axle load on the drive axle also reduces the deregulating pressures of the wheels on the drive axle. According to the process presented above, this would result in lowering the permissible braking pressure difference (ΔP) on the wheels of the steering axle, even though the vehicle is braked in a more stable manner due to the lowered liftable axle, i.e., a rather higher braking pressure difference (ΔP) on the wheels of the steering axle is possible without losing control of the vehicle. This disadvantage can be countered advantageously if a liftable axle in lowered position is recognized. This can be effected through sensors, for example, with signals being transmitted to the EBS or ABS electronic system. This makes it possible to increase the value of the permissible braking pressure difference (ΔP) on the wheels of the steering axle accordingly when the liftable axle is recognized as having been lowered.

Finally, it may also be advantageous to limit also the difference between the braking pressures of the two wheels of the rear axle. Here too, the braking pressure difference (ΔP) can be calculated according to one of the variants described above. The limitation on the rear axle is especially applicable in vehicles which are especially unstable on μ split roadways, e.g., solo driven semi-trailers.

The above-described invention is of course applicable correspondingly also to vehicles having more than one steering axle or more than one rear axle.

While the invention has been described by reference to specific embodiments, this was for purposes of illustration only. Numerous alternative embodiments will be apparent to those skilled in the art and are considered to be within the scope of the invention.

We claim:

1. A process for reducing yaw during braking in a vehicle traveling on a roadway having different frictional values on opposite sides of said vehicle, said vehicle having a front axle and a rear axle on which wheels are mounted, a high wheel being a wheel traveling on a side of the roadway having a higher coefficient of friction than a side of the roadway on which a low wheel travels, said vehicle being equipped with an anti-lock braking system which operates to deregulate braking pressure in any one of said wheels when said wheel begins to slip, a deregulating pressure being the braking pressure in said slipping wheel when deregulation begins, said process comprising detecting the braking pressures in said wheels, calculating a permissible braking pressure difference as a function of the deregulating pressure in a wheel for which regulation takes place, and adjusting the braking pressure in said high wheel so that the permissible braking pressure difference is maintained at a constant value, wherein said permissible braking pressure difference depends on said deregulating pressure of at least one of said wheels.

2. The process of claim 1 wherein said permissible braking pressure difference is proportional to the deregulating pressure of the low wheel on said front axle.

3. The process of claim 1 wherein said permissible braking pressure difference is proportional to the difference between the highest and lowest deregulating pressure of the wheels on said rear axle.

4. The process of claim 1 wherein said permissible braking pressure difference is proportional to the ratio of the highest and lowest deregulating pressure of the wheels on said rear axle.

5. The process of claim 1 wherein said permissible braking pressure difference is proportional to the sum of the deregulating pressures of the wheels on said rear axle.

6. The process of claim 1 wherein said permissible braking pressure difference is proportional to the sum of the deregulating pressures of the wheels on the rear axle and twice the deregulating pressure of the low wheel on the front axle.

7. The process of claim 1 wherein the braking pressure of the high wheel on said front axle is adjusted to be equal to the sum of the deregulating pressure in the low wheel on said front axle and the permissible braking pressure difference.

8. The process of claim 1 wherein the braking pressure of the high wheel on said front axle is adjusted to be equal to the sum of the braking pressure on the low wheel on said front axle and the permissible braking pressure difference.

9. The process of claim 1 wherein the braking pressure of the high wheel of the front axle is adjusted when the anti-lock braking system begins operation to be equal to the sum of the braking pressure of said low wheel on said front axle and the permissible braking pressure difference, and after a predetermined time, to the sum of the deregulating pressure of the low wheel on said front axle and the permissible braking pressure difference.

10. The process of claim 1 wherein said permissible braking pressure difference depends on the mean braking pressure of the low wheel.

11. The process of claim 1 wherein said vehicle further includes a liftable axle, and wherein the permissible braking pressure difference is set to a higher value when the liftable axle has been lowered than when said liftable axle is raised.

12. The process of claim 11 wherein the permissible braking pressure is set to depend on the ratio of the sum of the loads on the liftable axle and rear axle, and the load on the rear axle when the liftable axle has been lowered.

13. The process of claim 1 further comprising limiting the difference between the braking pressures in the wheels on the rear axle.

* * * * *